(12) United States Patent
Prabhakaran et al.

(10) Patent No.: US 9,790,761 B2
(45) Date of Patent: Oct. 17, 2017

(54) BOLTLESS RAM BLOWOUT PREVENTER BONNET

(71) Applicant: Hydril USA Distribution, LLC, Houston, TX (US)

(72) Inventors: Surendran Prabhakaran, Chennai (IN); Mareesan Bose, Chennai (IN); Premkumar Jayaprakasam, Chennai (IN); Arun Jeevagan, Chennai (IN); Sandhya Asok Kumar, Chennai (IN); Kathiresan Krishnasamy, Bangalore (IN); Raghavendra Muniswamy, Bangalore (IN); Manikandan Shenbagalingam, Bangalore (IN)

(73) Assignee: HYDRIL USA DISTRIBUTION LLC, Houston, TX (US)

( * ) Notice: Subject to any disclaimer, the term of this patent is extended or adjusted under 35 U.S.C. 154(b) by 0 days.

(21) Appl. No.: 14/753,721

(22) Filed: Jun. 29, 2015

(65) Prior Publication Data
US 2016/0377194 A1 Dec. 29, 2016

(51) Int. Cl.
*E21B 33/06* (2006.01)
*F16L 25/06* (2006.01)
*F16K 27/04* (2006.01)
*F16B 35/00* (2006.01)
*F16K 43/00* (2006.01)

(52) U.S. Cl.
CPC .......... *E21B 33/063* (2013.01); *E21B 33/061* (2013.01); *E21B 33/062* (2013.01); *F16B 35/005* (2013.01); *F16K 27/047* (2013.01); *F16K 43/00* (2013.01); *F16L 25/065* (2013.01); *Y10T 137/0491* (2015.04); *Y10T 137/6065* (2015.04)

(58) Field of Classification Search
CPC .... F16K 27/047; E21B 33/062; E21B 33/063; Y10T 137/8788; Y10T 137/0491; Y10T 137/6065; F16L 25/065; F16B 35/005
See application file for complete search history.

(56) References Cited

U.S. PATENT DOCUMENTS

| | | | |
|---|---|---|---|
| 3,345,087 A * | 10/1967 | Hanes ............... | A01K 63/04 285/321 |
| 4,253,638 A | 3/1981 | Troxell, Jr. | |
| 6,328,343 B1 * | 12/2001 | Hosie ............... | E21B 17/046 285/123.13 |
| 8,316,948 B2 * | 11/2012 | Stringfellow ...... | E21B 17/085 166/338 |

(Continued)

OTHER PUBLICATIONS

PCT Search Report and Written Opinion issued in connection with corresponding PCT Application No. PCT/US2016/039574 on Oct. 4, 2016.

*Primary Examiner* — Atif Chaudry
(74) *Attorney, Agent, or Firm* — Hogan Lovells US LLP

(57) ABSTRACT

The present invention relates to a boltless bonnet assembly for use in a blowout preventer (BOP). In some embodiments, the boltless bonnet assembly includes a bonnet having a forward end facing a ram body of the BOP stack, and a bonnet latch disposed within the bonnet, the bonnet latch attached to the forward end of the bonnet. The boltless bonnet assembly further includes a bonnet positioning mechanism in communication with the bonnet latch to move the bonnet latch into and out of engagement with the ram body.

17 Claims, 3 Drawing Sheets

(56) References Cited

U.S. PATENT DOCUMENTS

| | | |
|---|---|---|
| 8,408,514 B2 | 4/2013 | Yadav |
| 2002/0162981 A1 | 11/2002 | Berckenhoff |
| 2003/0085040 A1 | 5/2003 | Hemphill et al. |
| 2013/0264502 A1* | 10/2013 | Jahnke .................. E21B 33/061 |
| | | 251/1.3 |

* cited by examiner

BOLTLESS RAM BLOWOUT PREVENTER BONNET

BACKGROUND OF THE INVENTION

1. Field of the Invention

This technology relates to oil and gas wells, and in particular to a boltless bonnet assembly for a blowout preventer (BOP) for use in wellbore operations.

2. Brief Description of Related Art

The existing technologies for extracting fossil fuels use components such as a blowout preventer (BOP) for preventing well blowouts. A typical BOP includes a bore that runs through the BOP and connects to a wellbore. Due to the physical and mechanical demands placed on BOPs in the field, the components of a BOP assembly, such as the BOP rams, need to be examined, adjusted, machined and/or replaced periodically. The BOP bonnet assembly typically must be separated from the ram body of the BOP to allow access to serviceable components such as the ram block.

The operation of disengaging the BOP bonnets from the ram body can be very laborious, typically requiring specialized tools designed to accommodate connectors such as the large diameter bolts employed in these systems, and therefore requires appreciable time, effort and cost for the technicians and engineers charged with separating the bonnets. In addition, there is a significant concern related to the amount of down time for the rig, which requires the BOP for operation, and the potential millions of dollars that may be lost while the wellbore equipment is idle. Moreover, a wellbore may be located in an environment that may be difficult to access, such as a deep water wellbore, where even greater costs, time, and associated operator safety concerns must be addressed.

SUMMARY OF THE INVENTION

The present invention relates to a boltless bonnet assembly for use in a BOP stack. In some embodiments, the boltless bonnet assembly can include a bonnet having a forward end facing a ram body of the BOP stack, a bonnet latch disposed within the bonnet, the bonnet latch attached to the forward end of the bonnet, and a bonnet positioning mechanism in communication with the bonnet latch to move the bonnet latch into and out of engagement with the ram body.

Alternate embodiments of the boltless bonnet assembly can include a bonnet having a forward end facing a ram body of the BOP stack, a bonnet latch disposed within the bonnet, the bonnet latch attached to the forward end of the bonnet, and a screw operably attached to the bonnet and bonnet latch for driving the bonnet latch into and out of engagement with the ram body.

Some embodiments of the present invention can further include a method for attaching a bonnet to a ram body of a BOP. The method can include the steps of positioning the bonnet adjacent the ram body, and rotating an engagement/disengagement screw attached to a bonnet latch in a first direction in the bonnet to drive a bonnet latch into engagement with the ram body.

BRIEF DESCRIPTION OF THE DRAWINGS

So that the manner in which the features, advantages and objects of the invention, as well as others which will become apparent, are attained, and can be understood in more detail, more particular description of the invention briefly summarized above may be had by reference to the embodiments thereof which are illustrated in the appended drawings that form a part of this specification. It is to be noted, however, that the drawings illustrate only a preferred embodiment of the invention and are therefore not to be considered limiting of its scope as the invention may admit to other equally effective embodiments. The present technology will be better understood on reading the following detailed description of nonlimiting embodiments thereof, and on examining the accompanying drawings, in which.

DETAILED DESCRIPTION OF THE INVENTION

Figure 1:
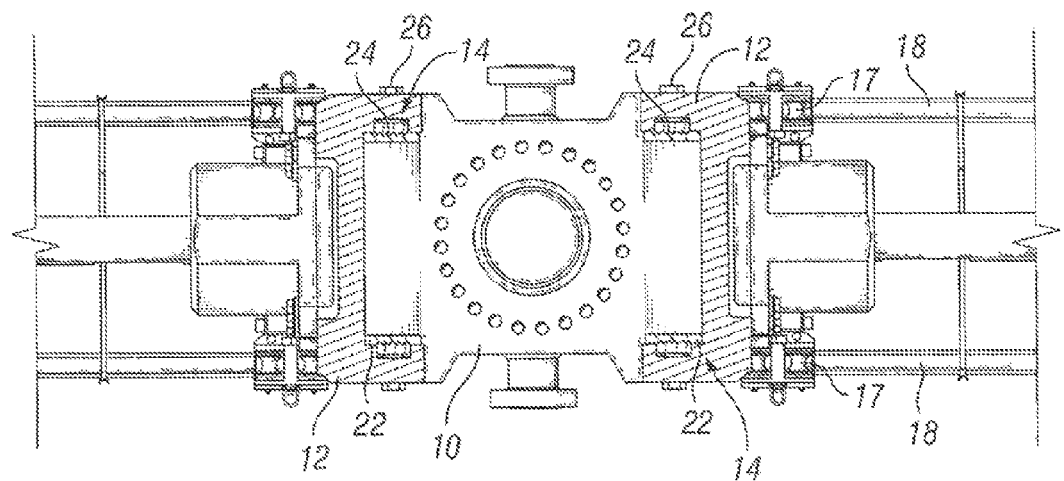
FIG. 1 is a top view of a BOP assembly according to an embodiment of the present technology.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the technology is not intended to be limited to the specific terms used, and it is to be understood that each specific term includes equivalents that operate in a similar manner to accomplish a similar purpose.

A "connector", in accordance with the present invention, refers to a composition or device capable of adjoining two or more components through one or more machined perforations, insertions, latches and/or welds, including but not limited to threading, perforation, wedge connection and key connection.

As used herein, the term "boltless" refers to a type of connection or engagement using a connector that lacks or does not require a torqeable bolt, fastener, a hinge, a wedge including a multiple wedge, a lockable key connector or key plate or any other connector capable of reversibly engaging two or more components where at least one of the connectable components possesses a machined perforation or insertion. For instance, a boltless connector does not require the machining of threads or one or more wedge connectors or key plates for adjoining one or more connectable components such as a boltless ram blowout preventer bonnet assembly and/or an operator body. In a preferred embodiment, a boltless connection may be exemplified by a bonnet latch comprising a series of toothed latches for engaging or attaching a boltless ram blowout preventer bonnet assembly to an operator body.

Figure 2:
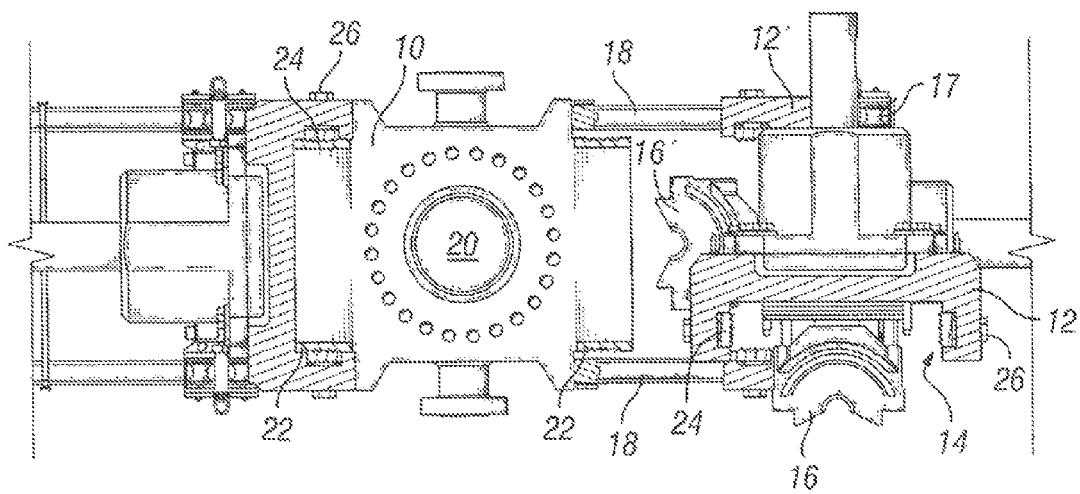
FIG. 2 is a top view of the BOP assembly of FIG. 1 with the bonnet disengaged from a ram body.

Referring to FIG. 1, there is shown a top view of a BOP assembly, including a ram body 10 and a bonnet 12. The ram body 10 is attached to the bonnet 12 by a boltless bonnet assembly 14. The bonnet 12 is in turn attached to additional components of the BOP assembly, such as the BOP rams 16 (shown in FIG. 2). FIG. 2 depicts an alternate top view of the BOP assembly wherein the bonnet 12 on one side of the ram body 10 is separated from the ram body 10 to provide access to the BOP rams 16.

As shown in FIG. 2, the bonnet 12 and BOP rams 16 can slide on rollers 17 engaged with rails 18 attached to the ram body 10. The bonnet 12 can be attached to a swiveling yoke (not shown) that is mechanically connected to the rollers 17 and the rails 18, but that is free to swivel relative to the rails 18. Thus, the bonnet 12 can be pulled away from the ram body 10 until the BOP rams 16 are clear of the ram body 10. Then, the bonnet 12 can swivel to orient the BOP rams 16 in a direction away from the ram body 10. This provides access to the BOP rams 16 for servicing, replacement, etc. As further shown in FIG. 2, some embodiments allow one bonnet 12 and BOP ram 16 to swivel, while other bonnets 12' and BOP rams 16' do not swivel. Thus, an operator can access discrete BOP rams as necessary, without rotating all of the rams associated with a particular BOP assembly.

Although the ability to remove the bonnet 12 and BOP rams 16 from the ram body 10 may be desirable for purposes of servicing the BOP rams 16, during normal operations, the bonnet 12 must be fixed relative to the ram body 10 so that the BOP rams can close across the bore 20 of the ram body 10, as needed. Accordingly, the present technology provides a boltless bonnet assembly 14 that allows for easy attachment and release of the bonnet 12 to and from the ram body 10.

Figure 3:
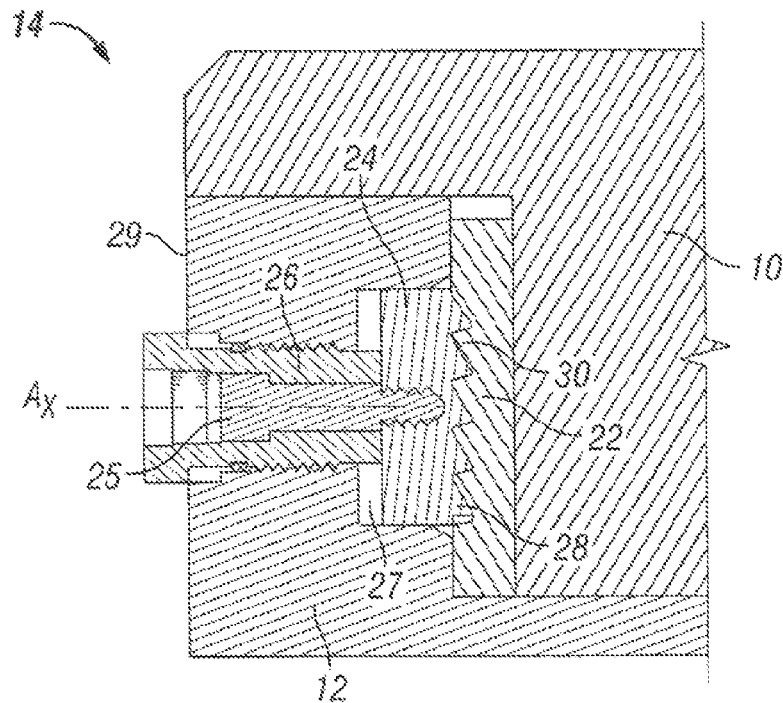
FIG. 3 is an enlarged top cross-sectional view of a boltless bonnet assembly according to an embodiment of the present technology.

Referring now to FIG. 3, there is shown an enlarged top cross-sectional view of the boltless bonnet assembly 14, including a body latch 22, a bonnet latch 24, and an engagement/disengagement positioning mechanism, which can optionally be a screw 26. In some embodiments, the body latch 22 can be bolted to the ram body 10, although this is not required. The body latch 22 could be attached to the ram body 10 by other appropriate means, or could be integral to the ram body 10. The engagement/disengagement positioning screw 26 can, in some embodiments, be attached to the bonnet latch 24 by a fastener 25. The fastener 25 can be inserted through the engagement/disengagement screw 26 and into threaded engagement with the bonnet latch 24. In the embodiment shown, the fastener 25 is not fixed relative to the engagement/disengagement screw 26 so that the engagement/disengagement screw 26 can rotate independently of the fastener 25.

Figure 4:
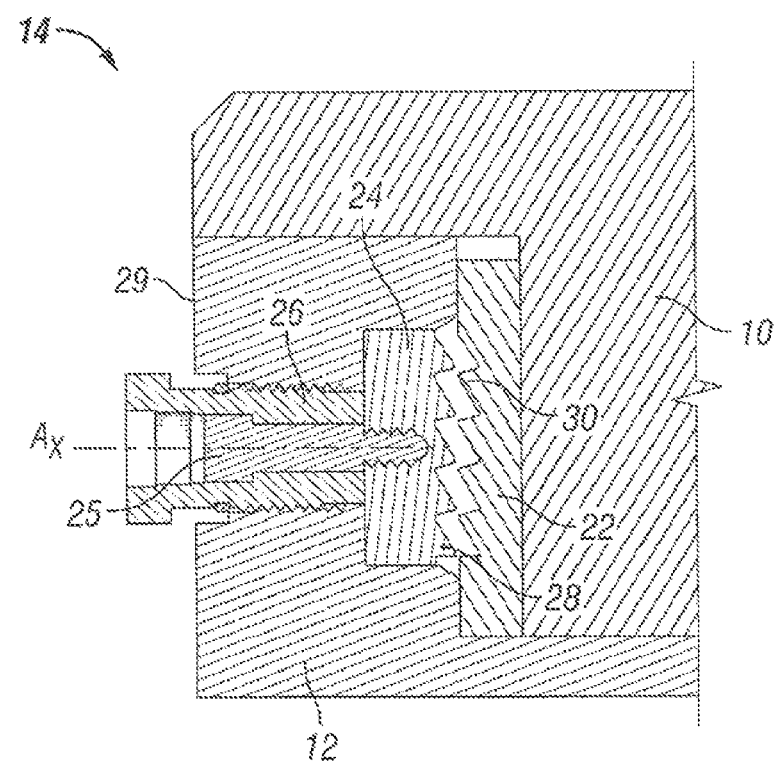
FIG. 4 is an enlarged top cross-sectional view of the boltless bonnet assembly of FIG. 3 with the bonnet latch disengaged from the body latch.

The bonnet latch 24 is contained with a bonnet recess 27 in the bonnet 12, and may have a length substantially equal to the thickness of the bonnet 12. The bonnet recess 27 can be shaped to receive the bonnet latch 24 when in a retracted position (discussed below). The bonnet latch 24 includes bonnet latch teeth 28 that engage corresponding body latch teeth 30 on the body latch 22. Although the bonnet latch teeth 28 and the body latch teeth 30 are shown to be a particular shape in the FIGS., it is to be understood that the teeth can be any appropriate shape or configuration. In addition, the cross-sectional areas of the individual bonnet latch teeth 28 and body latch teeth 30 can vary from tooth to tooth. At least one of the body latch teeth, i.e., reference numerals 28 or 30, has opposing first and second flanks, as illustrated in FIGS. 2-4. The first and the second flanks are illustrated as angled relative to one another from a point of the at least one of the body latch teeth, i.e., reference elements 28 or 30, toward the ram body 10. FIGS. 2-4 further demonstrate that the first flank is positioned nearer to the ram bore 20 and has a steeper pitch relative to an axis of the ram cavity 32 than the second flank.

The engagement/disengagement screw 26 is attached to the bonnet latch 24 by the fastener 25 and extends through the bonnet 12 to an outside surface 29 of the bonnet 12. The engagement/disengagement screw 26 can be moved axially along axis $A_x$ relative to the bonnet 12 to move the bonnet latch 24 from an engaged position (as shown in FIG. 3, wherein the bonnet latch teeth 28 are engaged with the body latch teeth 30) and a disengaged position (as shown in FIG. 4, wherein the bonnet latch teeth 28 are disengaged from the body latch teeth 30). In some embodiments, the engagement/disengagement screw 26 may have external threads that correspond to internal threads in the bonnet 12 so that by rotating the engagement/disengagement screw 26, the threads drive the engagement/disengagement screw 26 axially toward or away from the ram body 10. As will be appreciated by the skilled artisan, the use of toothed latches 22, 24 to attach the bonnet 12 to the ram body 10 advantageously eliminates the need to attach the bonnet 12 to the ram body 10 using bolts or similar connectors, and reduces the number of parts required for the assembly.

Referring to FIG. 4, and as briefly described above, there is shown the boltless bonnet assembly 14, including the bonnet latch 24, the engagement/disengagement screw 26, and the bonnet 12. In FIG. 4, the bonnet latch 24 is disengaged from the body latch 22 attached to the ram body 10.

The toothed bonnet latch 24 and body latch 22, in addition to reducing the requisite number of parts associated with the boltless bonnet assembly 14 and the ram body 10, advantageously decrease the human operator time and effort required for disengagement of the boltless bonnet assembly 14 from the ram body 10. For example, a traditional bonnet assembly, where the bonnet is bolted directly to the ram body 10, may require 30-50 minutes or more to disassemble from a ram body 10. This is because each individual bolt must be removed before the bonnet can be separated from the ram body. The boltless bonnet assembly 14 of the present invention, however, may be removed from a ram body 10 in approximately 10 minutes. This is because all that is required is to rotate the engagement/disengagement screw 26 until the bonnet latch teeth 28 disengage from the body latch teeth 30. Rotation of the engagement/disengagement screw 26 can be accomplished by any method, including, for example, using a remotely operated device (ROV).

Figure 5:
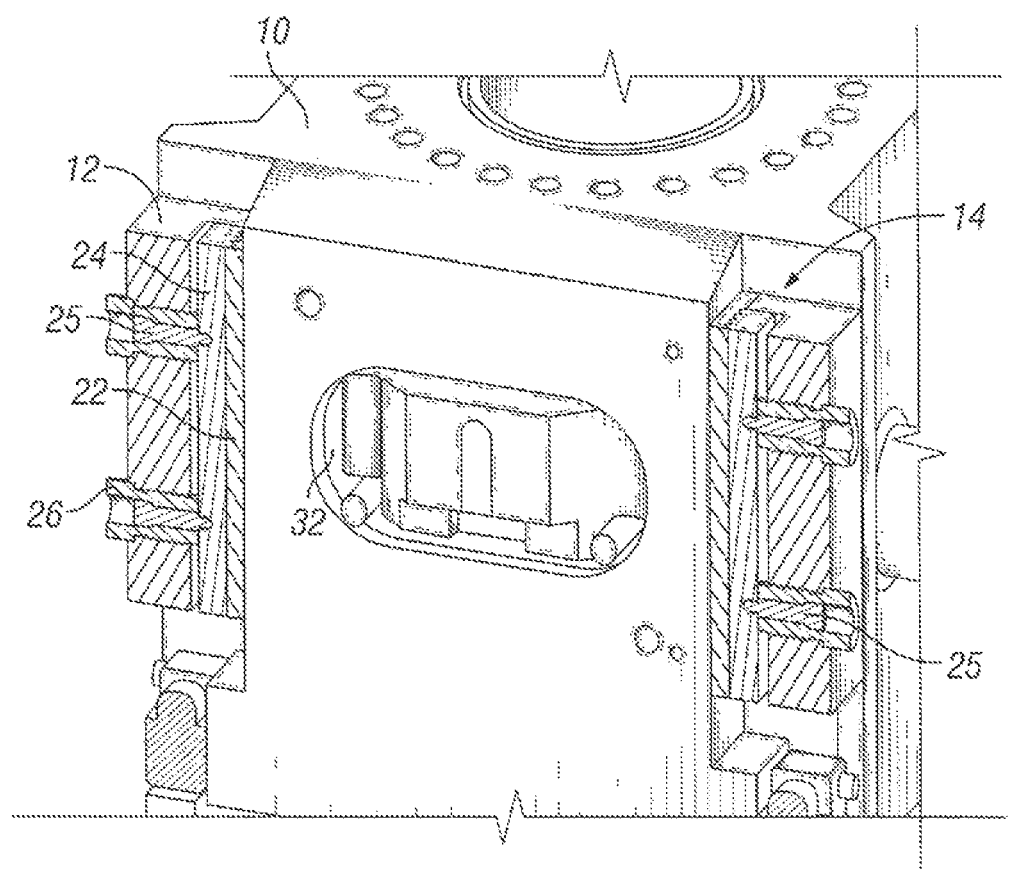
FIG. 5 is a perspective cutaway view of the BOP assembly according to an embodiment of the present technology.

Referring to FIG. 5, to better understand the spatial arrangement of the components, there is shown a perspective cutaway view of a boltless ram blowout preventer according to an embodiment of the present technology. As shown, the bonnet latch 24 is engaged with the body latch 22 of the ram body 10 of a blowout preventer assembly. More specifically, the boltless bonnet assembly 14 is shown engaged with a ram body 10 as would occur during normal operations (i.e., when the BOP rams (not shown in FIG. 5) are operably positioned in the ram body 10). In FIG. 5, a ram cavity 32 is shown in the ram body 10. The ram cavity 32 is configured to accept the BOP rams 16 (shown in FIGS. 1 and 2).

Each of the features of the present technology, as described and shown in various combinations in the above-described embodiments, increase the ease with which a bonnet assembly may be operably attached to a ram body for assembling a BOP for wellbore applications. In fact, the boltless ram assembly shown and described herein significantly decreases the time and effort required to assemble and disassemble commonly used, bolt jointed ram BOP bonnets.

The present technology advantageously reduces the servicing time of the ram block as well as the physical demands associated with the servicing. In addition, the external latching associated with the boltless bonnet assembly of the present invention beneficially allows for easier visual inspection of the engagement of the locking components of the BOP. The elimination of bolts and other connectors further allows the boltless bonnet assembly to exhibit an improved tolerance towards debris and related components that may adversely affect BOP function.

While the technology has been shown or described in only some of its forms, it should be apparent to those skilled in the art that it is not so limited, but is susceptible to various changes without departing from the scope of the invention. Furthermore, it is to be understood that the above disclosed embodiments are merely illustrative of the principles and applications of the present invention. Accordingly, numerous modifications may be made to the illustrative embodiments and other arrangements may be devised without departing from the spirit and scope of the present invention as defined by the appended claims.

The singular forms "a", "an" and "the" include plural referents, unless the context clearly dictates otherwise.

"Optional" or "optionally" means that the subsequently described component may or may not be present or the event or circumstances may or may not occur. The description includes instances where the component is present and instances where it is not present, and event or circumstance occurs and instances where it does not occur.

What is claimed is:

1. A boltless bonnet assembly for use in a blowout preventer (BOP), the boltless bonnet assembly comprising:
    a bonnet having a forward end facing a ram body of the BOP, the ram body defining a ram bore extending through the ram body in a first direction, and a ram cavity extending through the ram body in a second direction along a ram cavity axis;
    a body latch comprising a plurality of body latch teeth and attached to the ram body, the body latch teeth extending in a direction transverse to the ram cavity axis, at least one of the body latch teeth having opposing first and second flanks angled relative to one another from a point of the at least one of the body latch teeth toward the ram body, the first flank positioned nearer to the ram bore and having a steeper pitch relative to the ram cavity axis than the second flank;
    a bonnet latch disposed within the bonnet, the bonnet latch attached to the forward end of the bonnet and having a plurality of bonnet latch teeth; and
    a plurality of fasteners of a bonnet positioning mechanism that is in communication with the bonnet latch to move the bonnet latch in the first direction so that the body latch teeth engage and disengage the bonnet latch teeth.

2. The boltless bonnet assembly of claim 1, wherein the bonnet positioning mechanism is selected from the group consisting of threadless mechanical fittings, hydraulic fittings, pressed fittings, and flange fittings.

3. The boltless bonnet assembly of claim 1, further comprising the body latch fixedly attached to the ram body and positioned for engagement with the bonnet latch.

4. The boltless bonnet assembly of claim 3, wherein the plurality of body latch teeth are attached to and extend from the surface of the body latch.

5. The boltless bonnet assembly of claim 4, wherein the plurality of bonnet latch teeth and the plurality of body latch teeth have variable cross-sectional areas.

6. A boltless bonnet assembly for use in a blowout preventer (BOP), the boltless bonnet assembly comprising:
    a bonnet having a forward end facing a ram body of the BOP, the ram body defining a ram bore extending through the ram body in a first direction, and a ram cavity extending through the ram body in a second direction along a ram cavity axis;
    a body latch comprising a plurality of body latch teeth and attached to the ram body, the body latch teeth extending in a direction transverse to the ram cavity axis, at least one of the body latch teeth having opposing first and second flanks angled relative to one another from a point of the at least one of the body latch teeth toward the ram body, the first flank positioned nearer to the ram bore and having a steeper pitch relative to the ram cavity axis than the second flank;
    a bonnet latch disposed within the bonnet, the bonnet latch attached to the forward end of the bonnet and having a plurality of bonnet latch teeth; and
    a plurality of a screws operably attached to the bonnet and bonnet latch for driving the bonnet latch in the first direction so that the body latch teeth selectively engage and disengage the bonnet latch teeth.

7. The boltless bonnet assembly of claim 6, wherein the screws are attached to the bonnet and the bonnet latch is moveable relative to the bonnet between a first position and a second position, wherein when in the first position, the bonnet latch teeth engage the body latch teeth, and when in the second position, the bonnet latch teeth disengage the body latch teeth.

8. The boltless bonnet assembly of claim 6, wherein the screws extend through the bonnet from the bonnet latch to an outside surface of the bonnet.

9. The boltless bonnet assembly of claim 6, further comprising the body latch fixedly attached to the ram body and positioned for engagement with the bonnet latch.

10. The boltless bonnet assembly of claim 9, wherein the plurality of body latch teeth are attached to and extend from the surface of the body latch.

11. The boltless bonnet assembly of claim 10, wherein the plurality of bonnet latch teeth and the plurality of body latch teeth have variable cross-sectional areas.

12. The boltless bonnet assembly of claim 6, wherein the screws comprise two or more screws attached to the bonnet and the bonnet latch to move the bonnet latch into and out of engagement with the ram body.

13. The boltless bonnet assembly of claim 12, wherein the two or more screws extend through the bonnet and attach to the bonnet latch.

14. A method for attaching a bonnet to a ram body of a blowout preventer (BOP), the method comprising:
    a) positioning the bonnet adjacent the ram body, the ram body defining a ram bore extending through the ram body in a first direction, and a ram cavity extending through the ram body in a second direction along a ram cavity axis, the ram body further having a body latch comprising a plurality of body latch teeth extending in a direction transverse to the ram cavity axis, at least one of the body latch teeth having opposing first and second flanks angled relative to one another from a point of the at least one of the body latch teeth toward the ram body, the first flank positioned nearer to the ram bore and having a steeper pitch relative to the ram cavity axis than the second flank; and
    b) rotating engagement/disengagement screws attached to a bonnet latch having a plurality of bonnet latch teeth to drive a bonnet latch teeth in the first direction and into engagement with the body latch teeth.

15. The method of claim 14, further comprising:
    rotating the engagement/disengagement screws to release the bonnet latch teeth from engagement with the body latch teeth.

16. The method of claim 14, further comprising:
with the bonnet latch teeth disengaged from the body latch teeth, sliding the bonnet away from the ram body until BOP rams in the ram body are accessible for repair or replacement.

17. The method of claim 16, further comprising:
rotating the bonnet and the BOP rams relative to the ram body to improve accessibility of the BOP rams.

* * * * *